(12) United States Patent
Gunshi et al.

(10) Patent No.: US 6,324,146 B2
(45) Date of Patent: *Nov. 27, 2001

(54) DISK DRIVING APPARATUS

(75) Inventors: Hirokazu Gunshi; Kouichi Eguro, both of Hachioji (JP)

(73) Assignee: Konica Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/969,472

(22) Filed: Nov. 13, 1997

(30) Foreign Application Priority Data

Nov. 14, 1996 (JP) .................................. 8-302933

(51) Int. Cl.[7] .................................................. G11B 33/02
(52) U.S. Cl. ............................................................ 369/77.2
(58) Field of Search .................................. 369/75.2, 77.2, 369/191, 271, 292; 360/98.04, 98.05, 98.06, 98.08, 99.02, 99.06, 97.01, 99.07

(56) References Cited

U.S. PATENT DOCUMENTS

| 4,652,949 | * | 3/1987 | Muraoka | 360/96.5 |
|---|---|---|---|---|
| 4,654,840 | * | 3/1987 | Takahashi | 369/75.2 |
| 4,727,444 | * | 2/1988 | Fukushima et al. | 369/75.2 |
| 4,866,693 | * | 9/1989 | Odawara et al. | 369/75.2 |
| 4,931,890 | * | 6/1990 | Cousino | 360/93 |
| 5,204,793 | * | 4/1993 | Plonczak | 360/97.01 |
| 5,373,406 | * | 12/1994 | Jansen | 360/96.5 |
| 5,400,198 | * | 3/1995 | Suzuki et al. | 360/99.06 |
| 5,537,271 | * | 7/1996 | Kumai et al. | 360/99.06 |
| 5,572,498 | * | 11/1996 | Choi | 369/77.2 |
| 5,583,710 | * | 12/1996 | Nicklos et al. | 360/71 |
| 5,590,109 | * | 12/1996 | Ookawa et al. | 369/77.2 |
| 5,617,397 | * | 4/1997 | Jones et al. | 369/77.2 |
| 5,650,891 | * | 7/1997 | Thayne et al. | 360/99.06 |
| 5,724,210 | * | 3/1998 | Sawada | 360/99.06 |
| 5,815,344 | * | 9/1998 | Aoki | 360/99.06 |
| 5,854,719 | * | 12/1998 | Ginosar et al. | 360/69 |
| 5,912,786 | * | 6/1999 | Nicklos et al. | 369/99.06 |

\* cited by examiner

Primary Examiner—David Davis
Assistant Examiner—Angel Castno
(74) Attorney, Agent, or Firm—Finnegan, Henderson, Farabow, Garrett & Dunner, L.L.P.

(57) ABSTRACT

In a disk driving apparatus in which a disk cartridge having therein an information recording medium and a clutch on a part of the disk cartridge is inserted for reproducing or recording information on the information recording medium, the apparatus includes: a clutch provided on a part of the disk driving apparatus for engaging with the clutch on the disk cartridge to rotate the information recording medium; a moving member for interlocking with an inserting operation of the disk cartridge to move; an elastic displacement member for accumulating elastic energy caused by movement of the moving member; and a clutch engagement member for engaging the clutch on the disk cartridge with the clutch on the disk driving apparatus by the elastic displacement member in which the elastic energy is accumulated.

3 Claims, 6 Drawing Sheets

DISK DRIVING APPARATUS

BACKGROUND OF THE INVENTION

The present invention relates to a disk driving apparatus, and more particularly, to a disk driving apparatus into which a disk cartridge having therein an information recording medium such as a magneto-optical disk or a magnetic disk is inserted for reproduction thereof and/or recording.

In the disk driving apparatus in prior art, a disk cartridge having therein an information recording medium such as a magneto-optical recording medium or a magnetic recording medium is inserted and a clutch section on the part of the disk cartridge is engaged with that on the apparatus main body, for reproduction of the information recording medium and/or recording. As a method for engagement and/or disengagement of the clutch sections mentioned above, there has been known a method wherein, for example, the clutch section of the disk cartridge or that of the apparatus main body is moved by utilizing torque generated by rotation of a motor, for engagement and disengagement.

As a method to take out a disk cartridge inserted in a disk driving apparatus, there has been known a method wherein the disk cartridge is caused to spring out of an insertion inlet to be taken out by a prescribed length by a spring which is exclusive for taking out of a disk cartridge.

There has further been known a disk driving apparatus wherein magnetic force is used for engagement of a clutch section on the part of a disk cartridge and that on the apparatus main body, and magnetic force adsorption surfaces of both clutches are pulled apart evenly and perpendicularly so that they may be disengaged from each other.

In addition to the foregoing, there has been known a disk driving apparatus wherein a movement guide for moving another base board relatively to a base board on the main body is provided as a separate part, and a cam member which moves along another cam surface attached relatively to a clutch driving base board is provided as a separate part.

Further, in a disk driving apparatus, a magnetic circuit of an electromagnetic actuator used in the internal mechanism of the disk driving apparatus is provided independently and is separated from a magnetic circuit for access of an access movement section.

However, the technologies in prior art mentioned above respectively have the following problems.

In the mechanism for engagement and/or disengagement of clutches in the disk driving apparatus, multi-step reduction gears are provided on motor output for engagement or disengagement of clutches. Therefore, the mechanism for engagement or disengagement of clutches is made to be complicated, inhibiting that the disk driving apparatus is made to be small in size and inexpensive in price.

When there is independently provided a spring member which makes a disk cartridge to spring out of an insertion inlet by a prescribed length when taking the disk cartridge out, complication and high price are caused.

When a disk cartridge and a magnetic clutch on the apparatus main body are simultaneously pulled perpendicularly to an adsorption surface to be separated from the entire adsorption surface, greater force is needed for the separation and the apparatus is made to be large in size.

When a movement guide is provided, as a separate part, on a board in the main body on which the movement guide is held, and when the cam member is provided, as a separate part, on a clutch driving board on which the cam member is held, the number of parts is increased, and cost for processing and incorporating the parts is increased accordingly.

Since an actuator such as an electromagnetic solenoid used in the internal mechanism of a disk driving apparatus is independently provided, the number of parts is increased, and cost for processing and incorporating the parts is increased accordingly.

SUMMARY OF THE INVENTION

The invention has been achieved in view of the problems mentioned above, and its object is to provide a low-priced and small-sized disk driving apparatus wherein engagement and disengagement between a disk cartridge and a clutch section on the apparatus main body are carried out by the use of elastic energy.

Another object of the invention is to provide a low-priced disk driving apparatus wherein it is easy to take out a disk cartridge.

Still another object of the invention is to provide a disk driving apparatus wherein a part of an information recording medium is touched and a magnetic force adsorption surface of the clutch section is subjected to one-sided pressing to be separated, and less force is needed for the separation.

Further object of the invention is to provide a low-priced disk driving apparatus wherein a movement guide used in an internal mechanism of the disk driving apparatus is united solidly with a member holding the movement guide, and a cam member is united solidly with a member holding the cam member.

Still further object of the invention is to provide a low-priced and small-sized disk driving apparatus wherein a magnetic circuit of an actuator such as an electromagnetic solenoid used in an internal mechanism of the disk driving apparatus is commonly used as an electric circuit for an access movement section for reproduction and recording of a disk.

The objects mentioned above can be attained by the following means.

A disk driving apparatus in which a disk cartridge having therein an information recording medium and a clutch on the part of the disk cartridge is inserted for reproducing from and/or recording on the information recording medium, comprising:

a clutch on the part of the disk driving apparatus which engages with the clutch on the part of the disk cartridge to rotate the information recording medium;

a moving means which interlocks with operations to insert the disk cartridge to move;

an elastic displacement means in which energy is accumulated when the moving means moves; and a clutch engagement means which engages the clutch on the part of the disk cartridge with the clutch on the part of the disk driving apparatus by means of the elastic displacement means in which elastic energy is accumulated.

BRIEF DESCRIPTION OF THE DRAWINGS

Each of FIGS. 5(A)–5(E) is a diagram of internal mechanism of a disk driving apparatus.

DETAILED DESCRIPTION OF THE PREFERRED EMBODIMENT

Figure 1:
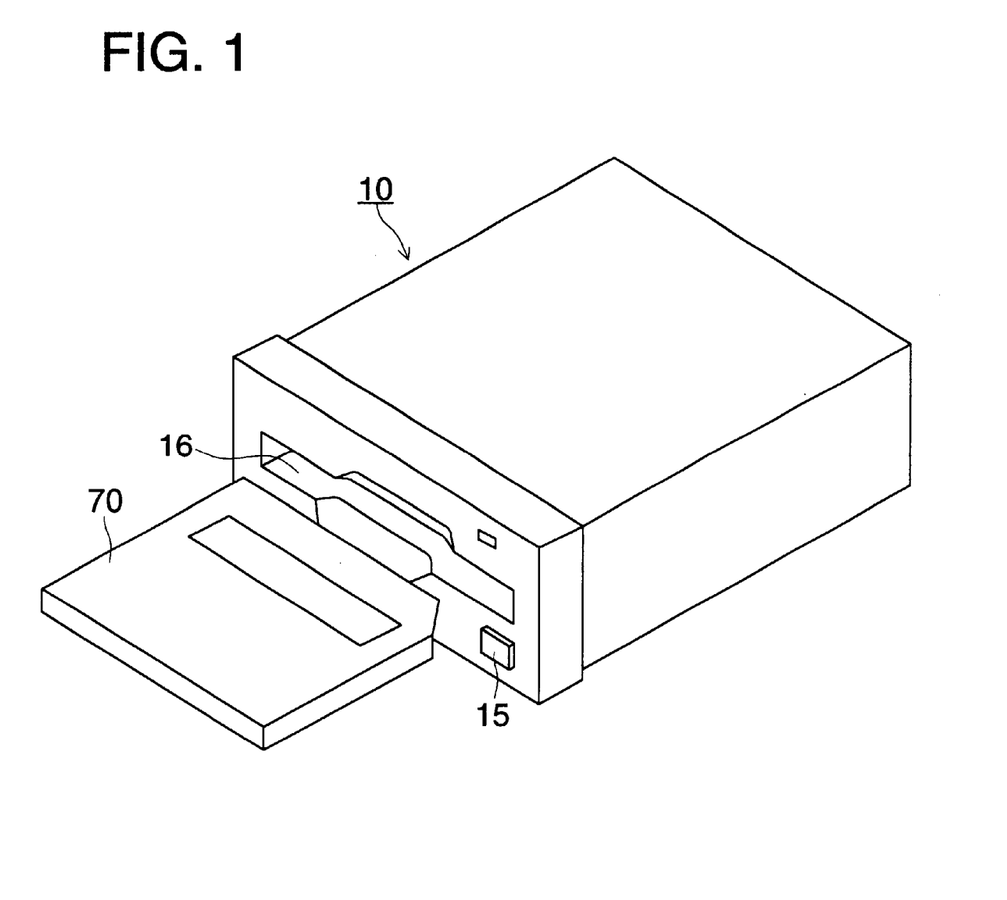
FIG. 1 is a perspective view of an appearance of a disk driving apparatus.
Figure 2:
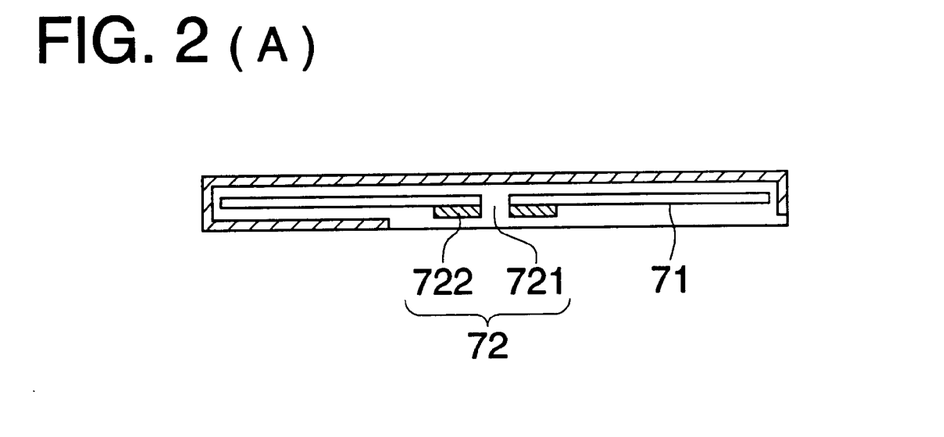
FIGS. 2(A) and 2(B) respectively represent an outside drawing of a disk cartridge.

A disk driving apparatus in an embodiment of the invention will be explained as follows, referring to the drawing. FIG. 1 is a perspective view of an appearance of the disk driving apparatus. Outside drawings of a disk cartridge are shown in FIG. 2 wherein FIG. 2(A) is a sectional view of a side of the disk cartridge and FIG. 2(B) is a rear view of the disk cartridge.

With regard to explanation of the outer portion of the disk driving apparatus made by referring to FIG. 1, disk driving apparatus 10 is so arranged that disk cartridge 70 having therein an information recording medium is inserted in the disk driving apparatus, and a clutch section on the part of a disk (information recording medium) and that on the part of an apparatus main body are engaged with each other for reproduction and/or recording of the information recording medium. The disk cartridge 70 can be inserted or taken out through insertion inlet 16. Insertion can be carried out by inserting the disk cartridge 70 into the insertion inlet 16, and taking out is carried out by pressing take-out button 15 which causes the disk cartridge 70 to spring out to be taken out.

Now, a disk cartridge used in the disk driving apparatus will be explained, referring to FIGS. 2(A) and 2(B). The disk cartridge 70 is covered with casing 73, disk 71 is a disk-shaped magneto-optical recording medium having a diameter of 3.5 inches, clutch section 72 located at the rotary center of disk 71 is arranged to be engaged with or disengaged from a clutch section on the part of an apparatus main body stated later, and magnetic adsorption surface 722 and a reference hole 721 on a clutch are provided.

Figure 3:
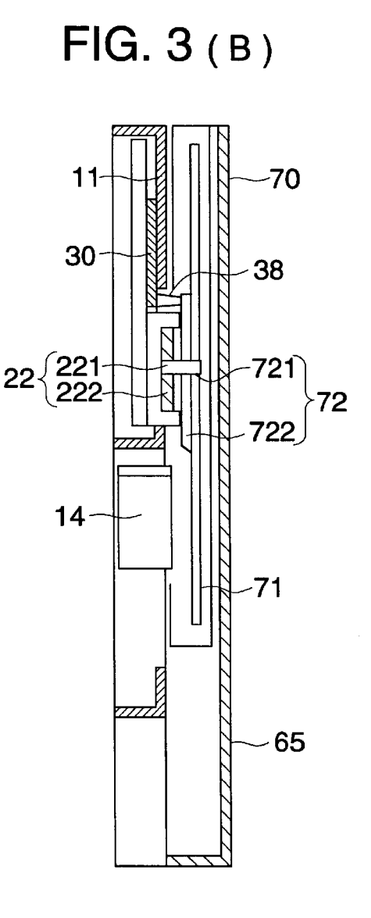
FIGS. 3(A) and 3(B) respectively represent a diagram of internal mechanism of a disk driving apparatus.
Figure 4:
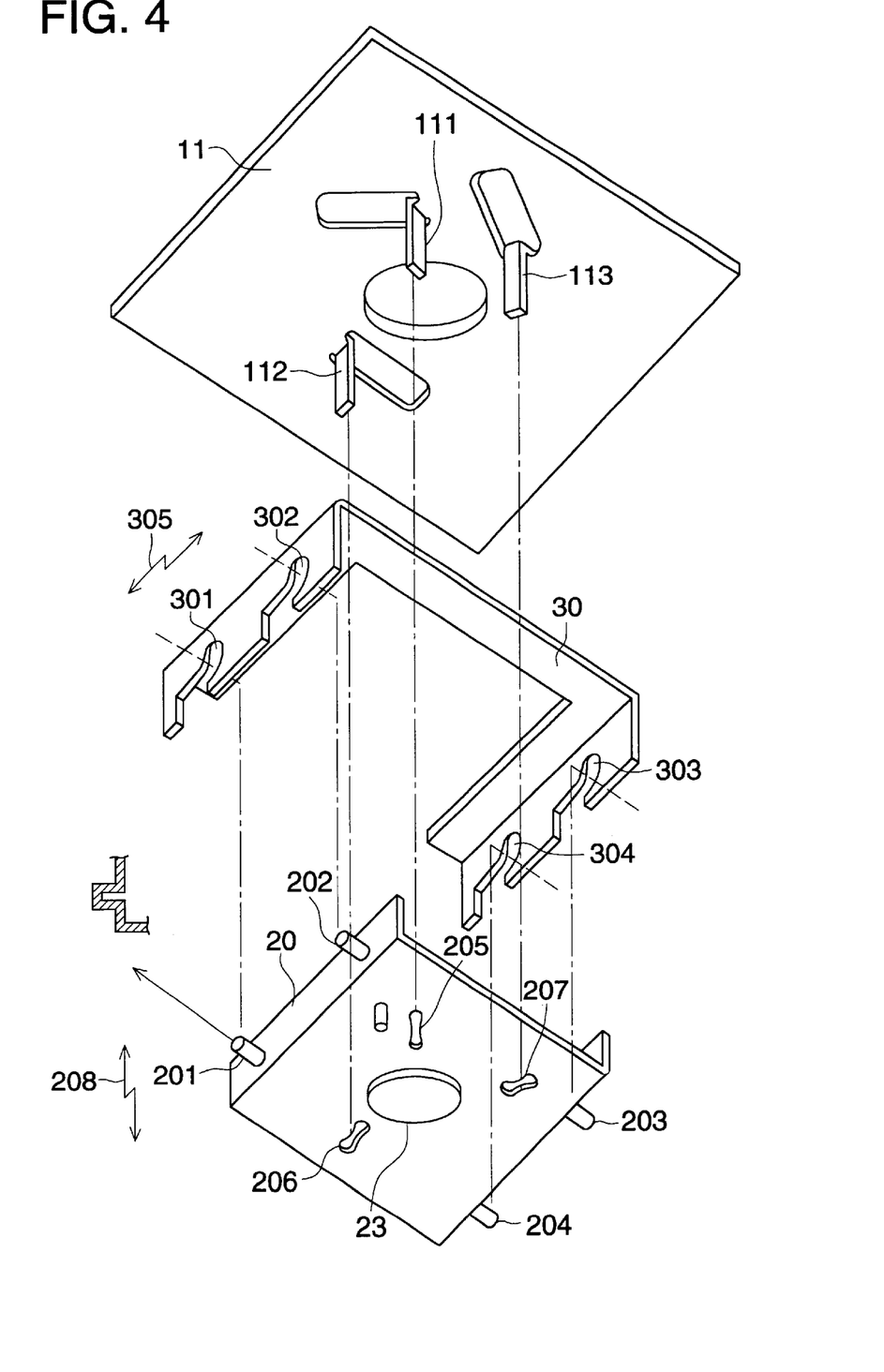
FIG. 4 is an exploded perspective view of primary portions of a disk driving apparatus.
Figure 5:
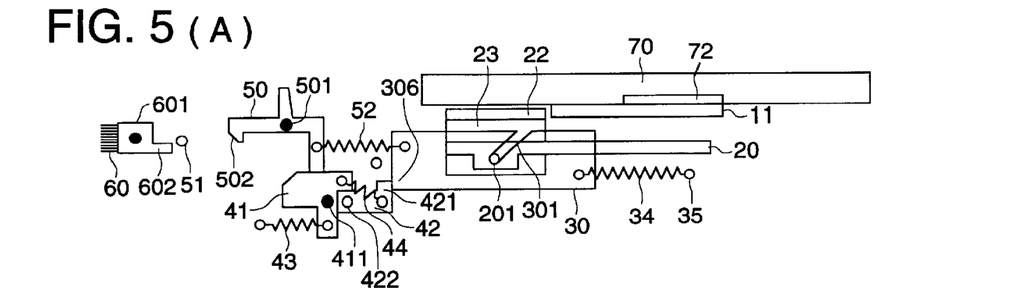

Next, an internal mechanism of the disk driving apparatus will be explained, referring to FIG. 3(A) through FIG. 6. FIGS. 3(A) and 3(B) represent an internal mechanism of the disk driving apparatus, FIG. 4 is an exploded perspective view of primary portions of the disk driving apparatus, Each of FIGS. 5(A)–5(E) is a diagram of internal mechanism of the disk driving apparatus, wherein FIG. 5(A) shows a disk cartridge that is on its half way to be inserted in the apparatus, FIG. 5(B) shows A moving member and B moving member which are in operation, and FIG. 5(C) shows the state wherein a cam plate moves and a disk cartridge is engaged with a clutch section on the apparatus main body. Further, FIG. 5(D) shows the state wherein an electromagnetic solenoid operates and an interlocked moving plate is moved, and FIG. 5(E) shows the state wherein the disk cartridge is disengaged from the clutch section.

The disk driving apparatus is composed of a main body base board, a portion through which a disk cartridge is inserted and taken out, a clutch driving portion (engagement and disengagement of clutch sections), an optical system unit, and a control section.

Main body base board 11 is a base board of a disk driving apparatus main body, and spindle motor base board 20 is made to be movable on the main body base board.

A clutch driving means makes clutch section 72 of disk 71 to be disengaged from clutch section 22 on the apparatus main body, and it is a mechanism to rotate the clutch section. The clutch section 22 on the apparatus main body is so arranged that standard pin 221 is engaged with reference hole 721 and then magnet 222 attracts adsorption surface 722 of the disk. The cam plate 30 moves spindle motor base board 20 up and down. It is so arranged that stopper portion 306 of the cam plate 30 stops B moving member 42. Incidentally, cam plate stopping pin 32 serves as a stopper for the cam plate 30 (FIGS. 3(A) and 3(B), FIGS. 5(A)–5 (C)).

The spindle motor base board 20 representing a base board on which a clutch driving means is installed is provided on main body base board 11 to be movable in the rotary shaft direction, and spindle motor 23 which rotates a disk is installed on the spindle motor base board.

Now, the main body base board 11, cam plate 30 and spindle motor base board 20 representing a clutch driving base board will be explained more particularly. The main body base board 11 is provided at three locations thereon with movement guides 111, 112 and 113 each being cut to be bent at a right angle so that each of them may be engaged with each of guide slits 205, 206 and 207 located on the spindle motor base board 20. Each movement guide is formed by cutting and bending a portion of the main body base board 11. Next, the cam plate 30 is provided at four locations thereon with cam grooves 301, 302, 303 and 304 each of which is engaged with each of pin members 201, 202, 203 and 204 on the spindle motor base board 20 to move in the direction of arrow mark 305. The spindle motor base board 20 is provided at four locations thereon with pin members 201, 202, 203 and 204 which are engaged respectively with the cam grooves 301, 302, 303 and 304, and is further provided with guide slits 205, 206 and 207 which are engaged respectively with the movement guides 111, 112 and 113, so that the spindle motor base board 20 may move in the direction of arrow mark 208 (see FIG. 4).

Next, interlocked moving plate 50 representing an interlocked moving means is rotatable around shaft 501 which is slidable on the apparatus main body. The interlocked moving plate 50 is arranged to be interlocked with an operation to insert disk cartridge 70 to be moved, and when the movement ends, latching section 502 is engaged with pin 51 (see FIGS. 5(A)–5(C)).

The pin 51 which is a latching means latches the interlocked moving plate 50, and electromagnetic solenoid 60 which is an electromagnetic actuator is structured to employ a magnetic circuit for access use and to have a coil in the magnetic circuit of the actuator, so that the electromagnetic solenoid may push the latching section 502 of the interlocked moving plate 50 to unlatch it (see FIG. 5(D)).

Moving member 40 representing a moving means is composed of moving member A 41 and moving member B 42, and is moved by the interlocked moving plate 50 to latch or release the movement of cam plate 30. The moving member A 41 is rotatable around shaft 411 and is further provided with its tip portion 412. The moving member A 41 is urged clockwise by spring 43. The moving member B 42 is rotatable around shaft 411 and is further provided with pin 422, and is in contact with the tip portion 412. Latching section 421 latches cam plate 30. Spring 44 is positioned between the moving member A 41 and moving member B 42 to urge them (see FIG. 5(A)).

First spring 52 representing a first elastic displacement means is positioned between the interlocked moving plate 50 and cam plate 30 so that elastic energy is accumulated in the first spring when the interlocked moving plate 50 is moved. Incidentally, the first spring 52 serves also as a means to take a disk cartridge out and to move it.

Second spring 34 representing a second elastic displacement means is positioned between spring-fixing pin 35 for main body base board 11 and the cam plate 30 so that elastic energy is accumulated in the second spring when the cam plate 30 is moved by the first spring 52 (FIG. 3(A), FIGS. 5(C) and 5(D)).

The first and second elastic displacement means may be made of a coil spring, a leaf spring or rubber.

When a disk cartridge is separated from a clutch section of the apparatus main body, eccentric-load-based separating member 38 which is an eccentric-load-based separating means comes in contact with a part of the information recording medium 71 mentioned above to separate clutch sections by eccentrically pressing a magnetic force adsorption surface. As a variation, the eccentric-load-based separating member 38 may also be moved in the direction of the disk rotary shaft (see FIG. 3(B)).

Disk cartridge chamber 65 is a chamber wherein disk cartridge 70 is housed, optical unit 13 is an optical unit for reproducing from and recording on disk 71, and access moving section 14 is provided with a voice coil composed of a coil and a magnetic circuit, and is moved by a linear motor to the position for reproducing a disk and recording on a disk. The numeral 17 in FIG. 3(A) is a permanent magnet (see FIGS. 3(A) and 3(B)).

Control circuit section 18 is a portion of a control circuit for a disk driving apparatus which conducts rotation control of a disk, control of an access moving section, reproduction of an information recording medium and processing of information signals relating to recording (see FIG. 3(A)).

Figure 6:
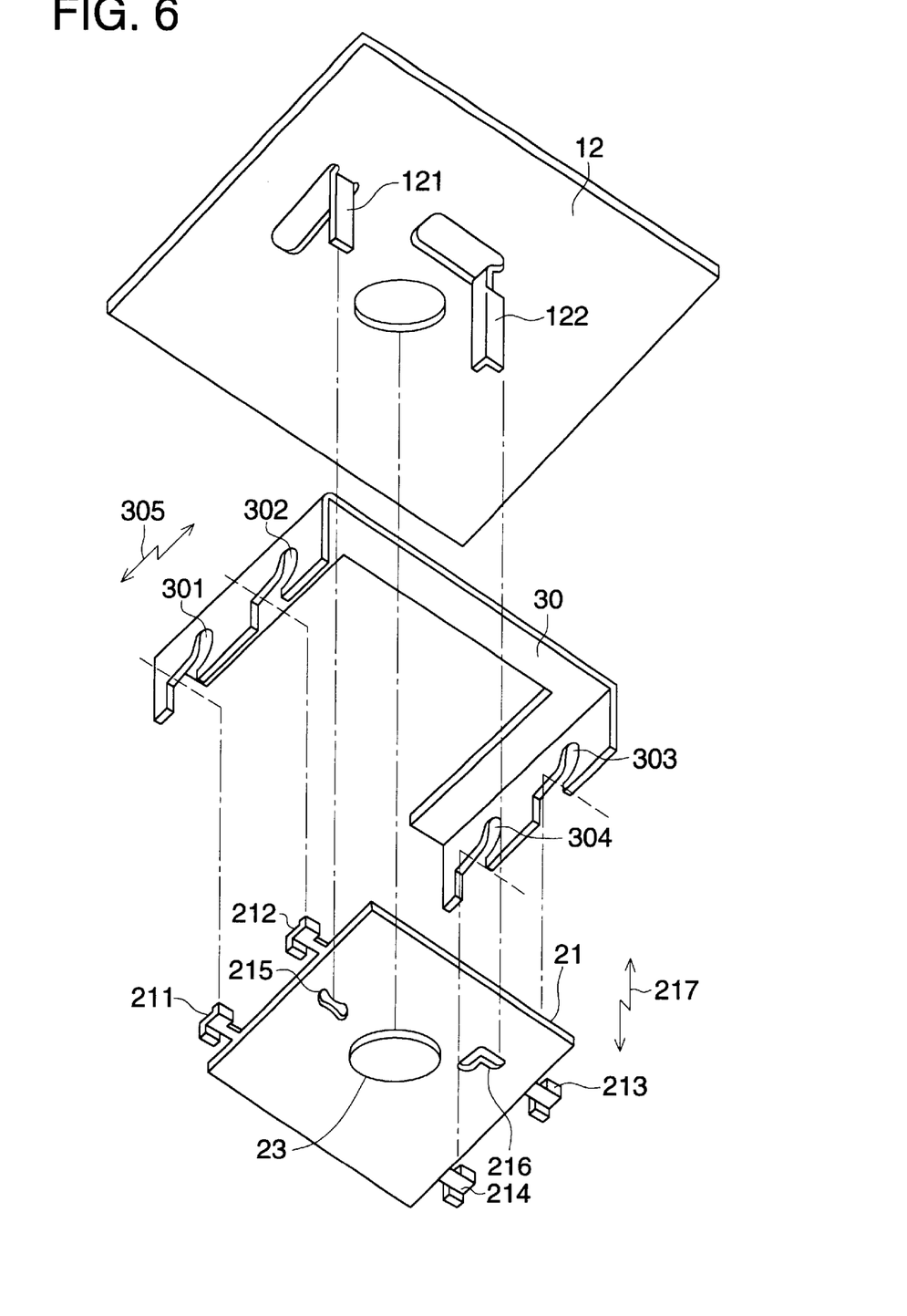
FIG. 6 is an exploded perspective view of other primary portions of a disk driving apparatus.

Now, the variations of the main body base board, cam plate, and spindle motor base board will be explained, referring to FIG. 6. FIG. 6 is an exploded perspective view of other primary parts of the disk driving apparatus, and main body base board 12 is provided at two locations thereon with movement guides 121 and 122 each being cut and bent at a right angle, and the movement guides are arranged to be engaged respectively with guide grooves 215 and 216 located on spindle motor base board 21 which will be stated later. Each of the movement guides is formed by cutting and bending a part of the main body base board. The cam plate 30 is provided thereon with cam grooves 301, 302, 303 and 304 positioned at four locations, and the cam grooves are engaged respectively with pin members 211, 212, 213 and 214 on the spindle motor base board 21 stated later to move in the direction of arrowed mark 305. The spindle motor base board 21 is provided at four locations thereon with pin members 211, 212, 213 and 214 which are engaged with the cam grooves 301, 302, 303 and 304, and is further provided with guide grooves 215 and 216 which are engaged with the movement guides 121 and 122. The spindle motor base board 21 is arranged to be moved in the direction of arrowed mark 217.

Now, operations in the disk driving apparatus including insertion of a disk cartridge, engagement and disengagement of clutch sections and taking out of the disk cartridge will be explained as follows, referring to FIG. 1 through FIG. 5(E).

1) Explanation for Operations of Insertion of a Disk Cartridge and Engagement

When disk cartridge 70 is inserted through insertion inlet 16, interlocked moving plate 50 is pushed by the disk cartridge 70 and moves (see FIG. 1 and FIG. 5(A)).

Movement of the interlocked moving plate 50 charges first spring 52 and further makes the moving member A 41 and moving member B 42 to operate, then latching section 306 of cam plate 30 is unlatched by the moving member B 42, and is latched on pin 51 by the movement of the interlocked moving plate 50 (see FIG. 5(B)).

Due to unlatching of the cam plate 30, the cam plate 30 is urged by the charged force of the first spring 52 to move, then pin members 201, 202, 203 and 204 are pushed by cam grooves 301, 302, 303 and 304, thereby the spindle motor base board 20 goes up, and clutch section 22 on the part of the apparatus main body is engaged with clutch section 72 of disk cartridge 70. More particularly, adsorption surface 722 is attracted to magnet 222, and concurrently with that, reference pin 221 is engaged with reference hole 721 (see FIGS. 4 and 5(C)).

Incidentally, when the cam plate 30 is moved, second spring 34 is charged by spring force of the first spring 52.

2) Explanation for Operations of Reproduction and Recording in the Disk Driving Apparatus Now, disk 71 rotates and reproduction and/or recording is carried out.

3) Explanation for Operations of Separation of a Disk Cartridge

When taking-out button 15 is pressed, electromagnetic solenoid 60 is operated to rotate around shaft 601, whereby the interlocked moving plate 50 is operated by separation section 602 to unlatch the pin 51. The cam plate 30 is moved by charged force of the second spring 34 (see FIGS. 1 and 5(D)).

Due to the movement of the cam plate 30, pin member 201 in cam groove 301 causes the spindle motor base board 20 to descend, and disk 71 of disk cartridge 70 is urged to move by an amount of its play, accordingly. In this case, the eccentric-load-based separating member 38 comes in contact with a part of the disk 71 (see FIGS. 3 and 5(D)).

When the clutch section 22 is further urged to descent, the disk 71 is pressed by the eccentric-load-based separating member 38 to be tilted and separated, thus, clutch section 72 can be separated from the clutch section 22 by a small force.

After that, a part of the disk cartridge 70 springs out of the insertion inlet 16 (see FIG. 5(E)).

The foregoing shows how insertion, engagement, separation and taking out of the disk cartridge 70 are conducted.

Though the magneto-optical disk has been explained as a disk cartridge in the present embodiment, a magnetic disk cartridge is also acceptable. Though the eccentric-load-based separating member 38 is of a fixed type in the present embodiment, it may also be of a movable type. Though the pin member 201 is provided on the part of the spindle motor 20, and a cam groove is provided on the part of the cam plate 30 in the present embodiment, they may also be provided conversely. Though an extension coil spring is used for the first spring and the second spring in the present embodiment, those which are transformed elastically such as a hair spring, a leaf spring and a compression coil spring may also be used. Either an electromagnet or one which unlatches mechanically can also be used as the electromagnetic solenoid 60. Though the upper surface and the lower surface of each of cam grooves 301, 302, 303 and 304 are used in the present embodiment respectively for engagement and disengagement between the clutch section on the part of the disk cartridge and the clutch section on the part of the apparatus main body in the present embodiment, it is also possible to use the surface on only one side of the groove either for the engagement or for the disengagement.

Since the invention is structured as in the foregoing, the following effects are produced by the invention. Namely, the invention makes it possible to realize a clutch driving section of a disk driving apparatus which is inexpensive in terms of price and is small in terms of size, because elastic energy caused by movement of an interlocked moving means is used for engagement and disengagement between a clutch section of a disk cartridge and that of the apparatus main body.

Further, each of engagement and disengagement between clutch sections can be carried out by an independent spring force, resulting in a simple structure, because engagement of clutch sections is conducted by the first elastic displacement means and disengagement of clutch sections is conducted by the second elastic displacement means.

It is further possible to cause clutch sections to engage with each other when the movement of a disk cartridge is latched, because there is provided a moving means which is operated by an interlocked moving means when the movement of the interlocked moving means is ended.

Since there is provided a latching means which latches an interlocked moving means when the movement of the interlocked moving means is ended, a disk cartridge moves while pushing the interlocked moving means, but when insertion of the disk cartridge is completed, an excessive side force is no longer applied on the disk cartridge.

Since there is provided a taking-out moving means wherein an interlocked moving means is moved in the direction to take out a disk cartridge by the first elastic displacement means charged after separation of a latching means, the disk cartridge moves, when it is taken out, from an insertion inlet by a prescribed length in the taking out direction, making the disk cartridge to be taken out simply and surely.

It is further possible to separate clutch sections with a small separating force, because there is provided an eccentric-load-based separating means which comes in contact with a part of the information recording medium in the case of separation of clutches and draws a magnetic force adsorption surface apart to separate it.

Since a clutch driving base board has pin members provided thereon solidly, it is possible to lower the cost of pin members.

Since the clutch driving base board forms a movement guide formed by cutting and bending each base board mentioned above, it is possible to lower the cost of movement guide parts.

It is further possible to realize low-priced and small-sized electromagnetic switches, because a magnetic circuit of an electromagnetic switch used in the apparatus main body serves also as the magnetic circuit for access mentioned above.

What is claimed is:

1. A disk driving apparatus for insertion of a disk cartridge having an information recording medium and a disk clutch to produce or record information on the information recording medium, the apparatus comprising:

a clutch of the disk driving apparatus for engaging with the disk clutch of the disk cartridge to rotate the information recording medium;

a moving means for interlocking and traveling with the disk cartridge during an inserting operation of the disk cartridge;

an elastic displacement means for accumulating elastic energy caused by movement of the moving means;

a clutch engagement means for engaging the disk clutch of the disk cartridge with the clutch of the disk driving apparatus by moving the clutch of the disk driving apparatus in a direction perpendicular to a traveling direction of the moving means through employing the elastic energy accumulated by the elastic displacement means;

an actuating means operated by movement of the moving means, for actuating the clutch engagement means;

a latching means for latching the moving means;

a releasing means for releasing the moving means latched by the latching means, wherein the elastic displacement means includes a first elastic displacement means and a second elastic displacement means, and elastic energy is accumulated in the first elastic displacement means in association with the movement of the moving means, and elastic energy is accumulated in the second displacement means in association with an operation of the actuating means, and wherein the moving means released by the releasing means actuates the disk cartridge to eject by the elastic energy accumulated in the first and second elastic displacement means.

2. A disk driving apparatus for insertion of a disk cartridge having an information recording medium and a disk clutch to produce or record information on the information recording medium, the apparatus comprising:

a clutch of the disk driving apparatus for engaging with the disk clutch of the disk cartridge to rotate the information recording medium;

a moving means for interlocking and traveling with the disk cartridge during an inserting operation of the disk cartridge;

an elastic displacement means for accumulating elastic energy caused by movement of the moving means;

a clutch engagement means for engaging the disk clutch of the disk cartridge with the clutch of the disk driving apparatus by moving the clutch of the disk driving apparatus in a direction perpendicular to a traveling direction of the moving means through employing the elastic energy accumulated by the elastic displacement means;

an actuating means operated by movement of the moving means, for actuating the clutch engagement means;

a latching means for latching the moving means;

a releasing means for releasing the moving means latched by the latching means, wherein the elastic displacement means includes a first elastic displacement means and a second elastic displacement means, and elastic energy is accumulated in the first elastic displacement means in association with the movement of the moving means, and elastic energy is accumulated in the second displacement means in association with an operation of the actuating means, and wherein the disk clutch on the part of the disk cartridge and the clutch on the part of the disk driving apparatus are separated from each other by the elastic energy accumulated in the second elastic displacement means in association with release by the releasing means.

3. The disk driving apparatus of claim 2, further comprising an eccentric-load-based separating means for applying an eccentric load to a part of the disk clutch on the disk cartridge so that the clutches on the cartridge and the disk driving apparatus are separated from each other.

* * * * *